United States Patent Office 3,702,875
Patented Nov. 14, 1972

3,702,875
MODIFICATION OF OXIDATIVE DEHYDROGENATION CATALYSTS
Harold E. Manning and Marvin Z. Woskow, Houston, and Harold F. Christmann, Seabrook, Tex., assignors to Petro-Tex Chemical Corporation, Houston, Tex.
No Drawing. Filed Mar. 2, 1970, Ser. No. 15,903
Int. Cl. C07c 5/18
U.S. Cl. 260—680 E
14 Claims

ABSTRACT OF THE DISCLOSURE

Oxidative dehydrogenation of organic compounds with catalyst comprising a metal ferrite with cobalt or nickel metal compound as a catalyst modifier. For example, butene is oxidatively dehydrogenated to butadiene-1,3 with a catalyst comprising manganese ferrite modified with a minor amount of cobalt oxide.

BACKGROUND OF THE INVENTION (1) Field of the invention

This Application relates to the oxidative dehydrogenation of organic compounds.

(2) Description of the prior art

U.S. Pats. 3,270,080; 3,284,536; 3,303,234; 3,303,235; 3,303,236; 3,303,238; 3,308,182; 3,324,195; 3,334,152; 3,342,890; 3,420,911; 3,420,912; 3,428,703; 3,440,299; and others disclose the oxidative dehydrogenation of organic compounds with catalysts comprising ferrites.

SUMMARY OF THE INVENTION

In a process for the oxidative dehydrogenation of organic compounds with ferite catalysts, the improvement comprising modifying the ferrite catalyst with cobalt and/or nickel.

DESCRIPTION OF THE PREFERRED EMBODIMENTS

One of the primary objectives in catalyst development is to produce more active catalysts which still have high selectivity. Generally higher yields per pass can be obtained by more active catalysts. However, even if the absolute yield is not increased, it is an important advantage of a more active catalyst that the process can be operated at a lower reaction temperature. It has been discovered that the process of this invention may be operated at lower dehydrogenation temperatures using the catalysts of this invention. There are distinct disadvantages in operating the dehydrogenation process at excessively high temperatures, and at certain temperatures the process becomes uneconomical. For one thing, the mechanical stresses in the reactors are more pronounced at higher temperatures and consequently it is necessary to compensate for these stresses in the construction of the reactor. At high temperatures there is a problem of embrittlement of the reactor materials. Another advantage resulting from operating at lower temperatures is that the problem of quenching of the reaction gases is alleviated when operating at these lower temperatures and quenching can either be reduced or in some instances entirely eliminated. By avoiding quenching or by reducing the amount of quench water, there is less steam generated due to quenching and correspondingly there is less steam to be condensed downstream. Still another advantage of operating at a lower temperature is that thermal cracking reactions are less pronounced. There is also the advantage that a shorter reactor bed can be utilized, particularly when a predominately or essentially adiabatic reactor is employed.

Other advantages of this invention are possible, e.g. high selectivities and conversions are obtained. Also, it is possible to obtain a higher percentage utilization of oxygen for the dehydrogenation reaction and to obtain high conversions and selectivities at relatively low ratios of oxygen to organic compound. Still another feature of this process is that it is not necessary to use excessive ratios of steam to organic compound to produce a given yield.

The process of this invention may be applied to the dehydrogenation of a wide variety of organic compounds. Such compounds normally will contain from 2 to 20 carbon atoms, at least one

grouping, a boiling point below about 350° C., and such compounds may contain other elements, in addition to carbon and hydrogen such as oxygen, halogens, nitrogen and sulphur. Preferred are compounds having from 2 to 12 carbon atoms, and especially preferred are compounds of 3 to 6 or 8 carbon atoms.

Among the types of organic compounds which may be dehydrogenated by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile, propionaldehyde to acrolein, ethyl chloride to vinyl chloride, methyl isobutyrate to methyl methacrylate, 2 or 3 chlorobutene-1 or 2,3- dichlorobutane to chloroprene, ethyl pyridine to vinyl pyridine, ethylbenzene to styrene, isopropylbenzene to α-methyl styrene, ethylcyclohexane to styrene, cyclohexane to benzene, methane to ethylene and acetylene, ethane to ethylene to acetylene, propane to propylene or methyl acetylene, allene, or benzene, isobutane to isobutylene, n-butane to butene and butadiene-1,3-butene to butadiene-1,3 and vinyl acetylene, methyl butene to isoprene, cyclopentane to cyclopentene and cyclopentadiene-1,3- n-octane to ethyl benzene and ortho-xylene, monomethylheptanes to xylenes, propane to propylene to benzene, ethyl acetate to vinyl acetate, 2,4,4-trimethylpentane to xylenes, and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such as the conversion of propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 1,3-dichlorobutane, 1,4 dichlorobutane, the chlorofluoroethanes, methyl pentane, methylethyl ketone, diethyl ketone, n-butyl alcohol, methyl propionate, and the like.

Suitable dehydrogenation reactions are the following: acyclic compounds having 4 to 5 non-quaternary contiguous carbon atoms to the corresponding olefins, diolefins or acetylenes having the same number of carbon atoms; aliphatic hydrocarbons having 6 to 16 carbon atoms and at least one quaternary carbon atom to aromatic compounds, such as 2,4,4-trimethylpentene-1 to a mixture of xylenes; acyclic compounds having 6 to 16 carbon atoms and no quaternary carbon atoms to aromatic compounds such as n-hexane or the n-hexenes to benzene; cycloparaffins and cycloolefins having 5 to 8 carbon atoms to the corresponding olefin, diolefin or aromatic compound, e.g., cyclohexane to cyclohexene or cyclohexadiene or benzene; aromatic compounds having 8 to 12 carbon atoms including one or two alkyl side chains of 2 to 3 carbon atoms to the corresponding aromatic with unsaturated side chain such as ethyl benzene to styrene.

The preferred compounds to be dehydrogenated are hydrocarbons with a particularly preferred class being acyclic non-quaternary hydrocarbons having 4 to 5 contiguous carbon atoms or ethyl benzene and the preferred products are n-butene-1 or 2, butadiene-1,3, vinyl acetylene, 2-methyl-1-butene, 3-methyl-1-butene, 3-methyl-2-butene, isoprene, styrene or mixtures thereof. Especially preferred as feed are n-butene-1 or 2 and the methyl butenes and mixtures thereof such as hydrocarbon mixtures containing these compounds in at least 50 mol percent..

The organic compound to be dehydrogenated in contact with oxygen in order for the oxygen to oxidatively dehydrogenate the compound. The oxygen may be supplied to the organic compound from any suitable source as by feeding oxygen to a dehydrogenation zone for example as disclosed in U.S. 3,207,810, issued Sept. 21, 1965. Oxygen may be fed to the reactor as pure oxygen, as air, as oxygen-enriched air, oxygen mixed with diluents and so forth. Oxygen may also be supplied by means of a transport or moving oxidant type of process such as disclosed in U.S. 3,050,572, issued Aug. 21, 1962 or U.S. 3,118,007, issued Jan. 14, 1964 in which case the catalyst of this invention can partially or completely furnish the oxygen and therefore the catalysts could be referred to as an oxidant or oxygen carrier. Oxygen may be supplied partially by a solid oxidant and partially by gaseous oxygen. Oxygen may also be added in increments to the dehydrogenation zone. Oxygen may also be supplied by the release of oxygen from oxygen releasing compounds which are in gas phase in the dehydrogenation zone. Although determinations regarding the mechanism of reaction are difficult, the process of this invention is an oxidative dehydrogenation process wherein the predominant mechanism of dehydrogenation is by the reaction of oxygen with hydrogen and preferably at least 85 or 90 mol percent of the hydrogen atoms removed are by this reaction.

The amount of oxygen employed may vary depending upon the desired result such as conversion, selectivity and the number of hydrogen atoms being removed. Thus, to dehydrogenate butane to butene requires less oxygen than if the reaction proceeds to produce butadiene. Normally oxygen will be supplied (including all sources, e.g. air to the reactor or solid oxidant to the reactor) in the dehydrogenation zone in an amount from about 0.2 to 1.5, preferably 0.3 to 1.2, mols per mol of $H_2$ being liberated from the organic compound. Ordinarily the mols of oxygen supplied will be in the range of from .2 to 2.0 mols per mol of organic compound to be dehydrogenated and for most dehydrogenations this will be within the range of .25 to 1.5 mols of oxygen per mol of organic compound.

Preferably, the reaction mixture contains a quantity of steam or diluent such as nitrogen with the range generally being between about 2 and 40 mols of steam per mol of organic compound to be dehydrogenated. Preferably, steam will be present in an amount from about 3 to 35 mols per mol of organic compound to be dehydrogenated and excellent results have been obtained within the range of about 5 to about 30 mols of steam per mol of organic compound to be dehydrogenated. The functions of the steam are several-fold, and the steam may not merely act as a diluent. Diluents generally may be used in the same quantities as specified for the steam. These gases serve also to reduce the partial pressure of the organic compound.

It is one of the advantages of this invention that halogen may also be present in the reaction gases to give excellent results. The presence of halogen in the dehydrogenation zone is particularly effective when the compound to be dehydrogenated is saturated, such as a saturated hydrocarbon. The halogen present in the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides, such as ethyl iodide, methyl bromide, methyl chloride, 1,2-dibromo ethane, ethyl bromide, amyl bromide, and allyl bromide; cycloaliphatic halides, such as cyclohexylbromide; aromatic halides, such as benzyl bromide; halohydrins, such as ethylene bromohydrin; halogen substituted aliphatic acids, such as bromoacetic acid; ammonium iodide; ammonium bromide; ammonium chloride; organic amine halide salts, such as methyl amine hydrobromide; metal halides including molten halides; and the like. The halogen may be liberated partially or entirely by a solid source as disclosed in the process of U.S. 3,130,241, issued Apr. 21, 1964. Mixtures of various sources of halogen may be used. The preferred sources of halogen are iodine, bromine, and chlorine, and compounds thereof, such as hydrogen bromide, hydrogen iodide, hydrogen chloride, ammonium bromide, ammonium iodide, ammonium chloride, alkyl halides of one to six carbon atoms and mixtures thereof. When terms such as halogen liberating materials or halogen materials are used in the specification and claims, this includes any source of halogen such as elemental halogens, hydrogen halides, or ammonium halides. The amount of halogen, calculated as elemental halogen, may be as little as about 0.0001 or less mol of halogen per mol of the organic compound to be dehydrogenated to as high as 0.2 or 0.5. The preferred range is up to 0.09 mol of halogen per mol of the organic compound to be dehydrogenated.

The temperature for the dehydrogenation reaction generally will be at least about 250° C., such as greater than about 300° C. or 375° C., and the maximum temperature in the reactor may be about 700° C. or 800° C. or perhaps higher such as 900° C. under certain circumstances. However, excellent results are obtained within the range of or about 350° C. to 700° C., such as from or about 400° C. to or about 675° C. The temperatures are measured at the maximum temperature in the dehydrogenation zone. An advantage of this invention is that lower temperatures of dehydrogenation may be utilized than are possible in conventional dehydrogenation processes. Another advantage is that large quantities of heat do not have to be added to the reaction.

The gaseous reactants may be conducted through the reaction chamber at a fairly wide range of flow rates. The optimum flow rate will be dependent upon such variables as the temperature of reaction, pressure, particle size, and whether a fluid bed or fixed bed reactor is utilized. Desirable flow rates may be established by one skilled in the art. Generally the flow rates will be within the range of about 0.10 to 25 liquid volumes of the organic compound to be dehydrogenated per volume of dehydrogenation zone containing catalyst per hour (referred to as LHSV). Usually, the LHSV will be between 0.15 and about 5 or 10. For calculation, the volume of a fixed bed dehydrogenation zone containing catalyst is that original void volume of reactor space containing catalyst. When a solid oxidant is employed, the dehydrogenation zone is calculated from the point of contact of the compound to be dehydrogenated to the entrance to the separator to separate oxidant from dehydrogenated compound. The gaseous hourly space velocity (GHSV) is the volume of the organic compound to be dehydrogenated in the form of vapor calculated under standard conditions of 0° C. and 760 mm. of mercury per volume of reactor space containing catalyst per hour. Generally, the GHSV will be between about 25 and 6400, and excellent results have been obtained between about 38 and 3800. Suitable contact times in the dehydrogenation zone are, for example, from about 0.001 or higher to about 4 or 10 or 25 seconds, with particularly good results being obtained between 0.01 and 2 or 5 seconds. The contact time is the calculated dwell time of the reaction mixture in the dehydrogenation zone, assuming the mols of product mixture are equivalent to the mols of feed mixture.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less than about 75 p.s.i.a. and excellent results are obtained at about atmospheric pressure.

Catalyst binding agents or fillers not mentioned herein may also be used, but these will not ordinarily exceed about 50 percent or 75 percent by weight of the catalytic surface, and the described catalytic compositions will preferably constitute the main active constituent. These other binding agents and fillers will preferably be essentially inert. Preferred catalysts are those that have as a catalytic surface exposed to the reaction gases at least 25 or preferably 50 weight percent of the defined catalytic surface. The catalytic surface may be introduced as such or it may be deposited on a carrier by methods known in the art such as by preparing an aqueous solution or dispersion of a catalytic material and mixing the carrier with the solution or dispersion until the active ingredients are coated on the carrier. If a carrier is utilized, very useful carriers are silicon carbide, aluminum oxide, pumice, and the like. Other known catalyst carriers may be employed. When carriers are used, the amount of catalyst on the carrier will suitably be between about 5 to 75 weight percent of the total weight of the active catalytic material plus carrier. Another method for introducing the required surface is to utilize as a reactor a small diameter tube wherein the tube wall is catalytic or is coated with catalytic material. Other methods may be utilized to introduce the catalytic surface such as by the use of rods, wires, mesh, or shreds, and the like, of catalytic material. The catalytic surface described is the surface which is exposed in the dehydrogenation zone to the reaction gases, that is, e.g. if a catalyst carrier is used, the composition described as a catalyst refers to the composition of the surface and not to the total composition of the surface coating plus carrier.

The catalyst compositions of this invention may also comprise additives. Phosphorus, silicon or mixtures thereof are examples of additives. For instance, phosphorus and/or silicon may suitably be present in an amount of from about 0.1 to 30 weight percent, preferably .2 to 20 percent, based on the total weight of the defined metal atoms of the catalyst. These ingredients may contribute e.g. to the stability of the compositions. The silicon, phosphorus or other additives may be added at various stages of the preparation of the composition, or may be added to the already formed catalyst. Any suitable compounds may be employed such as phosphoric acid, phosphorus pentoxide, ethyl phosphate, ammonium phosphate, silicon halides, etc.

The catalyst composition may be reduced with a reducing gas, e.g. prior to use in the process of dehydrogenation. Examples of reducing gases are hydrogen or hydrocarbon and illustrations of reducing are disclosed e.g. in U.S. 3,284,536.

The catalysts to be modified with cobalt, nickel metal(s) or metal compound(s) (for convenience referred to as the modifier) according to this invention will comprise ferrites of the empirical formula $Me_xFe_yO_z$ with Me being defined as a metal(s), capable of forming a ferrite. The Periodic Table referred to throughout this application is the conventional Periodic Table such as is found on page 881, International Encyclopedia of Chemical Science, Van Nostrand, Princeton, N.J., 1964. In the formula, $x$ will preferably be present, e.g. within the range of about 0.1 to 2 inclusive and $y$ can be within the range of about 0.3 to 12 or 13 inclusive and $z$ will vary depending on the number of oxygen vacancies but will usually be within the range of about 3 to 18 or 19 inclusive and preferably will be about 4.

A preferred type of catalyst of this type is that having a face-centered cubic form of crystalline structure. Examples of this type of catalyst are ferrites of the general formula $MeO \cdot Fe_2O_3$ where Me is a divalent metal(s) cation such as $Mg^{++}$ or $Zn^{++}$. However, if the cations are large, such as $Sr^{++}$ (1.35 angstrom), the spinel structure may not occur and other types of ferrites having a hexagonal crystal of the type $SrO \cdot 6Fe_2O_3$ may be formed. These hexagonal ferrites are within the scope of the definition of catalysts of this invention.

Suitable catalysts may also be ferrites wherein other metals are partially substituted for the iron. For example, atoms having a valence of $+3$ may be partially substituted for some of the $Fe^{+++}$ atoms. Also, metal atoms having a valence of $+4$ may replace some of the $Fe^{+++}$ ions. However, the catalysts will still suitably have iron present in an amount described above in relation to the total atoms of the second metallic ingredient(s).

The catalysts may have the iron combined in crystalline structure with oxygen and more than one other metallic element, as mentioned above. For example, a preferred type of ferrite is that essentially or approximately of the formula, $MeFe_2O_4$, where Me represents a divalent metal ion(s) with an ionic radius approximately between 0.5 and 1.1 angstrom, preferably between about 0.6 and 1.0 angstrom. In the case of simple ferrites, Me may be, e.g., one of the divalent ions of the transition elements as Mg, Ca, Sr, Ba, Mn, Cr, Co, Ni, Zn or Cd. However, a combination of these ions is also possible to form a ferrite such as $Zn_{0.25}Mg_{0.75}Fe_2O_4$. Therefore, for this type of ferrite the symbol Me may represent a combination of ions which have an average valency of about two. However, it is essential that the crystalline structure contain iron and the metallic element other than iron.

Examples of catalysts are such as magnesium ferrite, cobalt ferrite, nickel ferrite, zinc ferrite, barium ferrite, strontium ferrite, manganese ferrite, calcium ferrite, cadmium ferrite, cerium ferrite, zirconium ferrite, or mixtures of ferrites, such as ferrites containing iron combined with at least one element selected from the group consisting of Mg, Zn, Ni, Co, Mn, Cu, Cd, Ca, Ba, Sr, Al, Cr, Ti, V, Mo, W, Na, Li, K, Sn, Pb, Sb, Bi, Ga, Rare earth elements such as Ce and mixtures thereof with a preferred group being Mg, Ca, Sr, Ba, Mn, Cr, Ce, Co, Ni, Zn and Cd, and particularly preferred metals being Mg or Mn. Preferred are catalysts of metals other than cobalt or nickel. Magnesium ferrite or manganese ferrite are the most preferred ferrites.

The valency of the metals in the catalysts do not have to be any particular values, although certain combinations are preferred or disclosed elsewhere. The determination of the valency of the ions is sometimes difficult and the results are uncertain. The different ions may exist in more than one valency state. However, a preferred catalyst is one which has the iron predominately in the $Fe^{+++}$ state. Some ferrites are described in Ferromagnetism, by Richard M. Bozorth (D. Van Nostrand Co., Inc., 1951), which disclosure is hereby incorporated by reference.

Although the catalysts may be broadly defined as containing crystalline structures of iron, oxygen and the second metallic ingredient(s), certain types of catalysts are preferred. Valuable catalysts were produced comprising as the main active constituent in the catalyst surface exposed to the reaction gases, iron, oxygen and at least one element from Group II-A, II-b, Mn, Cr, Ce or VIII (other than cobalt or nickel) of the Periodic Table such as those selected from the group consisting of magnesium, manganese, calcium, chromium, cadmium, chromium, zinc, cerium, barium, strontium, and mixtures thereof. Preferred catalysts have iron present as the predominant metal in the catalyst exposed in the reaction gases.

Ferrite formation may be accomplished by reacting an active compound of iron with an active compound of the designated metals. By active compound is meant a compound which is reactive under the conditions to form the ferrite. Starting compounds of iron or the other metal may be such as the nitrates, hydroxides, hydrates, oxalates, carbonates, acetates, formates, halides, oxides, etc. The starting compounds are suitably oxides or compounds which will decompose to oxides during the formation of the ferrite such as organic and inorganic salts or hydroxides. For example, manganese carbonate may be reacted with iron oxide hydrates to form manganese ferrite. Salts of the desired metals may be coprecipitated such as disclosed in U.S. 3,450,787 and the precipitate heated to form the ferrite. Methods for preparing catalysts to be modified according to this invention are disclosed in U.S. Pats. 3,270,080; 3,284,536; 3,303,234-5; 3,303,238; 3,308,182; 3,334,152; 3,342,890 and 3,450,787 and these disclosures are hereby incorporated by reference. The catalysts may contain unreacted precursors of the ferrite such as the oxides of Me or iron.

The catalyst modifier may be added to the ferrite by any suitable method. Generally the modifier will be added at such time that there will be intimate mixing with the other ingredients. If a catalyst carrier is employed, one convenient method is to form a liquid slurry of the modifier with the ferrite prior to coating on the carrier. The modifier may also be precipitated or dry-mixed. According to this invention, it has been discovered that superior results are obtained when the nickel or cobalt modifier is added to a preformed ferrite rather than incorporating the modifier with the ferrite precursor ingredients prior to reaction to form the ferrite.

The amount of modifier may be varied but best results have been obtained when the total weight of modifier atoms is present in an amount of no greater than 8 percent, and preferably no greater than 2 percent, by weight in relation to the total weight of the ferrite and any uncombined iron oxide. The weight of any catalyst carrier, on which the ferrite containing composition is coated, is not figured in the calculation of percent modifier. Excellent results have been obtained with no greater than one percent of the modifier atoms based on the total weight of ferrite and any uncombined iron oxide. On a weight basis of modifier compound, calculated as the oxide for convenience only, a preferred embodiment of this invention is the use of no greater than 3 weight percent of the modifier oxide based on the total weight of the metal ferrite and uncombined iron oxide and excellent results have been obtained at 2 weight percent or less with at least .001 or .01 weight percent being employed. Suitable ranges are such as from .01 to 2 or 5 weight percent modifier calculated as the oxide based on the total weight of metal ferrite and any uncombined iron oxide.

A great variety of metal compounds of cobalt or nickel may be used as the modifier. Metals of the described modifier in elemental forms may be employed and are included within the scope of this invention. The metals and organic compounds generally are changed to inorganic compounds thereof, at least on the surface, under the reaction conditions set forth herein. Particularly effective are inorganic compounds such as the oxides and salts including the phosphates and the halides, such as the iodides, bromides, chlorides and fluorides. The valence of the cobalt or nickel compounds may be +2, +3 or mixed valences. Materials which are useful as the modifier in the compounded contact mass for the process of this invention include $Co(C_2H_3O_2)_2$, $CoBr_2$, $CoCO_3$, $CoCl_3$, $Co(OH)_2$, $CoO$, $Co_3O_4$, $Co_2O_3$, $CoCl_2 \cdot 2NH_3$, $NiCO_3$, $NiCl_2$, $NiCl_2 \cdot 6H_2O$, $Ni$, $NiC_2O_4 \cdot 2H_2O$, $NiSi$, and so forth.

Preferably the catalyst will be solid under the conditions of reaction. Excellent catalysts are those comprising the oxides, phosphates, iodides, bromides, chlorides or fluorides of these elements. Many of the salts, oxides and hydroxides of the metals may change during the preparation of the catalyst, during heating in a reactor prior to use in the process of this invention, or are converted to another form under the described reaction conditions, but such materials still function as an effective modifier in the defined process. For example, many of the metal nitrates, nitrites, carbonates, hydroxides, acetates, and the like, may be converted to the corresponding oxide under the reaction conditions defined herein. Salts which are stable or partially stable at the defined reaction temperatures are likewise effective under the conditions of the described reaction, as well as such compounds which are converted to another form in the reactor. At any rate, the catalysts are effective if the defined catalysts are present in a catalytic amount in contact with the reaction gases. Useful catalyst combinations include cobalt or nickel oxide or halide and any of magnesium ferrite, manganese ferrite, zinc ferrite, barium ferrite or magnesium chromium ferrite.

EXAMPLE 1

As a control run, butene-2 is dehydrogenated to butadiene-1,3 with a magnesium ferrite catalyst which has not been modified with cobalt or nickel. The catalyst is Columbian Carbon magnesium ferrite type EG–1 which has been stabilized with 3 percent by weight of phosphoric acid. A fixed bed reactor is employed with a flow rate of 1.5 liquid hourly space velocity (LHSV). Steam and oxygen, as air, is fed at molar ratios of 20 and 0.5 $O_2$ respectively. The inlet temperature is 720° F. and the maximum temperature is 1040° F. The conversion is 64, the selectivity is 94 and the yield of butadiene is 60.0 mol percent per pass.

EXAMPLE 2

Example 1 is repeated with nickel as a modifier for the catalyst. The catalyst contains 0.3 percent by weight of nickel, calculated as Ni, based on the remaining catalyst. The nickel is in the form of nickel oxide in the final catalyst. The catalyst to be modified is the same magnesium ferrite of Example 1 with the phosphoric acid being reduced to equivalent to 2.5 percent P. The nickel is added to the preformed catalyst. Under the same reaction conditions the inlet temperature is reduced to 685° F., the exit temperature is reduced to 950° F., but the conversion is increased to 66 percent, the selectivity increased to 94.5 percent for a yield of 62.3 percent butadiene.

EXAMPLE 3

Example 1 is repeated using the same magnesium ferrite containing 3 percent phosphorus but being modified with 0.1 percent Ni. The Ni is added as a solution of $Ni(NO_3)_2 \cdot 6H_2O$ to an aqueous slurry of the magnesium ferrite catalyst of Example 1. The mixture is dried to remove the water and to decompose the nickel nitrate to nickel oxide. Under the same reaction conditions as in Example 1, the yield per pass is increased to 61.6 mol percent butadiene.

EXAMPLE 4

A control run for Example 5 is run to show the effect of the addition of cobalt to a ferrite catalyst. A magnesium ferrite catalyst containing 2 percent by weight phosphorus is pelleted and used for the dehydrogenation of butene-2 to butadiene-1,3 in a fixed bed reactor. The flow rate is 1.5 LHSV, the steam and oxygen, as air, ratios are 20 and 0.5 mols, respectively. After 48 hours of operation, the conversion, selectivity and yield were 65.5/95.4/62.5 per pass.

EXAMPLE 5

Example 4 is repeated with the exception that 2.0 percent by weight Co, calculated as Co but present as the oxide in the final catalyst, is added to a slurry of the catalyst of Example 4. The catalyst is then redried and pelleted as in Example 4. Using the same reactor and feed conditions as in Example 4, after 48 hours of operation the conversion, selectivity and yield are 70.8/95.1/67.3. Thus the conversion is increased with no significant drop in selectivity to result in an overall increase in yield.

EXAMPLES 6–9

Examples 6, 7, 8 and 9 illustrate the use of nickel or cobalt modified catalysts with or without halogen feed to the reactor. The halogen is based on the hydrocarbon feed to the reactor. The catalyst being modified is a pelleted magnesium ferrite catalyst and the LHSV, steam and oxygen ratios are 1.5, 20 and 0.55 respectively. Butene-2 is dehydrogenated to butadiene-1,3.

| Modifier | P.p.m. Cl | Conversion | Selectivity | Yield |
|---|---|---|---|---|
| 0.1% Ni | 0 | 67.6 | 95.4 | 64.5 |
| 0.1% Ni | 300 | 70.8 | 95.9 | 68.0 |
| 0.1% Co | 0 | 64.2 | 95.0 | 60.9 |
| 0.1% Co | 200 | 69.0 | 95.6 | 65.6 |

EXAMPLE 10

To illustrate the advantage of adding the modifier to the preformed ferrite rather than having the modifier incorporated prior to calcination to form the ferrite, a control run is made with no modifier. The catalyst is magnesium ferrite and butene-2 is dehydrogenated to butadiene-1,3 in a fixed bed reactor. Oxygen is fed at a rate of 0.50. The conversion, selectivity and yield are 65/95.3/62 at an inlet temperature of 695° F. and a maximum temperature of 985° F.

EXAMPLE 11

Example 10 is compared with this Example 11 wherein 0.08 weight percent Co is added to the ingredients prior to calcination. The conversion, selectivity and yield are 64.2/94.9/60.9, thus giving poorer results.

EXAMPLE 12

The advantage of nickel or cobalt as additives for manganese ferrite is illustrated by first running a control run with unmodified manganese ferrite. A mixture of 88 mol percent 2-methylbutene-2 and 8 mol percent 2-methyl butene-1 is dehydrogenated to isoprene in a fixed bed reactor. The flow rate is 1.5 LHSV and the ratios of oxygen (as air) and steam are 0.9 and 30 mols respectively per mol of hydrocarbon. The unmodified manganese ferrite gives a conversion of 57 and a selectivity of 89 mol percent isoprene.

EXAMPLE 13

The manganese ferrite catalyst of Example 12 is modified by adding 0.0371 mol of $Co_2O_3$ per 72.3 grams of catalyst. The selectivity is increased to 91 with essentially no change in conversions. Also if the temperature is increased the conversion is increased to 59 mol percent without any decrease of the selectivity of 89 percent, with the result being a higher yield.

EXAMPLE 14

The cobalt of Example 13 is replaced with .0371 mol of $Ni_2O_3$ per the 72.3 grams of catalyst. As in the case of Example 13, the conversion is increased to 59 percent with no decrease in the selectivity of 89 percent to isoprene.

EXAMPLES 15–19

The following examples are run in a fixed bed reactor of one inch diameter with a 50 cc. catalyst bed of ¼ x ¼ inch cylindrical pellets of the uncoated catalyst. The catalyst to be modified is screened to pass 6–8 mesh Tyler screens and then slurried in water. The modifier is added in the weight percent quantity indicated based on the weight of the catalyst being modified. A mixture of 50 mol percent n-butane and 50 mol percent n-butene-1 is dehydrogenated to a mixture of n-butene and butadiene-1,3. The flow rate is 1.0 LHSV, the ratio of oxygen (as air) and steam is 0.7 and 25 mols respectively per mol of hydrocarbon. The halogen is expressed in mols of halogen per mol of hydrocarbon feed. The reactor temperature is adjusted to give maximum yield.

| Catalyst | Modifier | Wt. percent | Halogen, mols |
|---|---|---|---|
| Zinc ferrite | $Co_3O_4$ | .5 | 0.1 $Br_2$ |
| Barium ferrite | $Ni_2O_3$ | 3.2 | 0.2 $Cl_2$ |
| Cerium ferrite | $NiCl_2$ | 0.2 | .1 $Cl_2$ plus .02 $Br_2$ |
| Nickel ferrite | $Ni_2O_3$ | 0.1 | .05 $I_2$ |
| Cadmium ferrite | $CoBr_2$ | .15 | 0.1 $NH_4Br$ |

The invention as claimed is:

1. A process for the oxidative dehydrogenation of organic compounds selected from the group consisting of ethyl benzene and hydrocarbons having 3 to 6 carbon atoms comprising contacting said organic compounds and oxygen in a ratio of from 0.2 to 2.5 mols of oxygen per mol of organic compound with a catalyst comprising (1) a metal ferrite comprising iron, oxygen and at least one element selected from the group consisting of Mg, Ca, Sr, Ba, Mn, Cr, Ce, Zn and Cd and (2) a catalyst modifier selected from the group consisting of cobalt oxide, cobalt salts, nickel oxide, nickel salts and mixtures thereof, said modifier being present in an amount of about 0.01 to 8 percent by weight based on the weight of metal ferrite and any uncombined iron oxide in said metal ferrite.

2. The process of claim 1 wherein the metals in said metal ferrite other than iron are present in a total amount of from .05 to 2.0 atoms per atom of iron.

3. The process of claim 1 wherein the crystalline structure of said metal ferrite is of the face-centered cubic form.

4. The process of claim 1 wherein said organic compound is a hydrocarbon selected from the group consisting of n-propane, n-butane, n-butene, pentane, pentene and mixtures thereof.

5. The process of claim 1 wherein said organic compound is normal butene.

6. The process of claim 1 wherein a halogen selected from the group consisting of iodine, bromine, chlorine and mixtures thereof is present in an amount of up to 0.09 mole of halogen per mole of organic compound during the dehydrogenation.

7. The process of claim 1 wherein the temperature of the reactants during contact with said catalyst is from 375° C. to 750° C.

8. The process of claim 1 wherein said metal ferrite is manganese ferrite.

9. The process of claim 1 wherein said metal ferrite catalyst is magnesium ferrite.

10. The process of claim 1 wherein said modifier is present in an amount no greater than 2 weight percent based on the weight of said metal ferrite and any uncombined iron oxide in said metal ferrite.

11. The process of claim 1 wherein the modifier is present as an oxide and the total weight of said modifier calculated as the oxides is present in an amount of no greater than two weight percent based on the total weight of said metal ferrite and any uncombined oxide in the said metal ferrite.

12. The process of claim 1 wherein said modifier is cobalt oxide.

13. The process of claim 1 wherein said modifier is nickel oxide.

14. A process for the oxidative dehydrogenation of n-butene to butadiene comprising contacting said n-butene and oxygen in a ratio of from 0.2 to 2.5 mols of oxygen per mol of n-butene with a catalyst comprising (1) a ferrite selected from the group consisting of magnesium ferrite and manganese ferrite and (2) nickel oxide, said nickel oxide being present in an amount from about 0.01 to 8 weight percent nickel oxide based on the weight of said ferrite catalyst.

References Cited

UNITED STATES PATENTS

| | | | |
|---|---|---|---|
| 3,303,238 | 2/1967 | Christmann | 260—680 |
| 3,270,080 | 8/1966 | Christmann | 260—680 |
| 3,342,890 | 9/1967 | Croce et al. | 260—680 |
| 3,526,675 | 9/1970 | Croce et al. | 260—680 |
| 3,334,152 | 8/1967 | Bajars et al. | 260—680 |
| 3,303,236 | 2/1967 | Croce et al. | 260—680 |
| 3,428,703 | 2/1969 | Woskow et al. | 260—680 |

PAUL M. COUGHLAN, JR., Primary Examiner

U.S. Cl. X.R.

252—462, 471, 473; 260—669 R, 683.3